March 31, 1970 W. HALPERN 3,503,285
BORING TOOL
Filed March 17, 1967
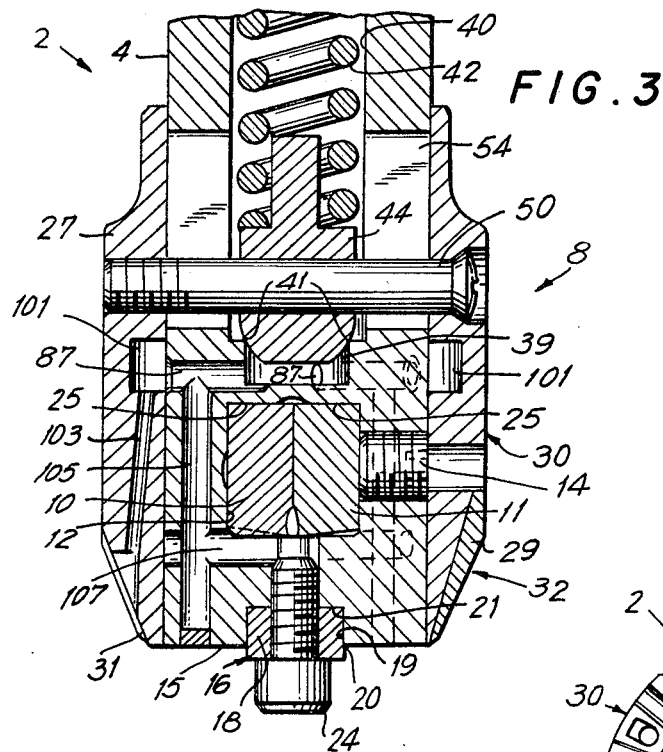
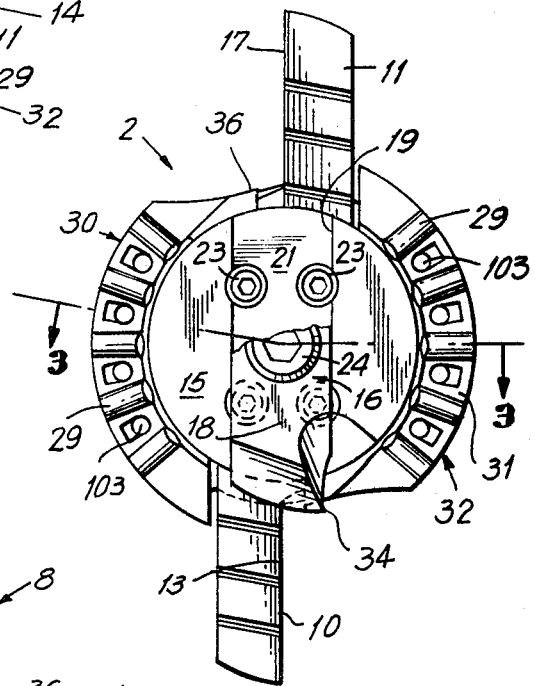
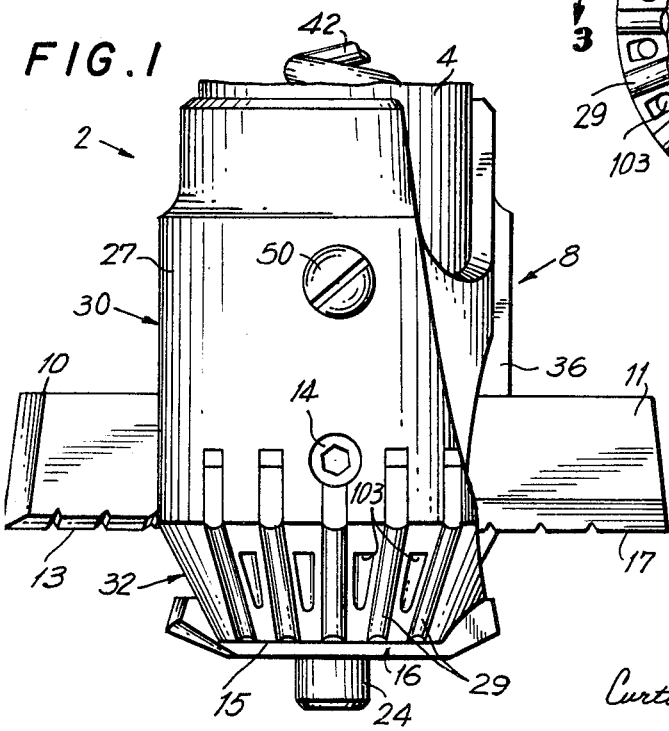
INVENTOR.
WILLIAM HALPERN
BY
Curtis, Morris & Safford
ATTORNEYS

United States Patent Office 3,503,285
Patented Mar. 31, 1970

3,503,285
BORING TOOL
William Halpern, Haviland Road,
Harrison, N.Y. 07029
Filed Mar. 17, 1967, Ser. No. 623,982
The portion of the term of the patent subsequent
to Mar. 21, 1984, has been disclaimed
Int. Cl. B23b 29/02
U.S. Cl. 77—58   1 Claim

ABSTRACT OF THE DISCLOSURE

A boring tool is disclosed of the type shown in United States Patents Nos. 3,309,945 and 3,314,314 but having two boring bits. The bits are positioned face to face with their cutting edges in substantial alignment. A sliding nose cone engages an original hole in the workpiece and provides firm support in alignment with the cutting edges.

---

This invention is related to those disclosed in my copending patent applications, Ser. Nos. 455,447 and 526,110 filed May 13, 1965 and Feb. 6, 1966, respectively, issued as Patents Nos. 3,309,945 and 3,314,314. All of the inventions relate to boring tools, particularly those tools for enlarging bores or holes in workpieces. The present invention is directed to improvement features which broaden the uses and applications of the boring tools, particularly the boring tools which have two boring bits.

An object of these inventions is to provide improved boring tools and the like. Another object is to provide improved metal working tools which are adapted to form holes of varying diameters and depths and with very accurate control. Another object is to provide efficient and dependable boring tools which may be used to enlarge cylindrical holes of relatively great depth and to maintain close tolerances from the standpoint of the location, size, and condition of the surface of the wall of the finished hole. Another object is to provide improved boring tools which are versatile in the senses that a single tool may produce holes of a wide range of diameters and depths. A further object is to provide tools of the above character which will produce holes of great accuracy, even though an original hole has been formed which is somewhat inaccurate in its location or size, or the relative angle of its axis. It is an object of the present invention to provide boring tools of the type disclosed in the above-identified co-pending applications, and which have two boring bits. The above and other objects will be in part obvious and in part pointed out below.

In the drawings in which one embodiment of the invention is shown:

FIGURE 1 is a side elevation of a boring tool constituting one embodiment of the invention;

FIGURE 2 is a bottom plan view of the boring tool of FIGURE 1; and

FIGURE 3 is a sectional view on the line 3—3 of FIGURE 2.

Except as specifically disclosed herein, the illustrative embodiment of the present invention is identical with that of the above-identified co-pending application, Ser. No. 526,110, (now Patent No. 3,314,314) and corresponding parts are similarly numbered.

Referring to FIGURE 1 of the drawings, a boring tool 2 has a boring bar 4, only the lower portion of which is shown, but which has an open axial bore 40 extending from its top to the closed lower end. The lower end of boring bar 4 carries the boring assembly 8 having two boring bits 10 and 11 (see also FIGURES 2 and 3) which are mounted face-to-face (FIGURE 3) in a transverse slot 12 in the boring bar. The boring bits 10 and 11 are clamped in adjusted position from the side by a set screw 14, and have cutting edges 13 and 17, respectively, each terminating at a circular release. At the bottom face 15 of the lower end of the boring bar, there is a transverse rectangular slot 20 with a surface 21, and threaded through surface 21 into the boring bar are four set screws 23. Set screws 23 clamp the boring bits against the top surface 25 of slot 12, with there being two of the set screws engaging each of the boring bits along the center line of its bottom face.

Mounted in slot 20 on boring bar 4 is an end-cutting boring bit or trueing bit 16 having a rectangular bar portion 18 which is snugly received in slot 20 and which has a bit with a cutting edge at each end. End-cutting boring bit 16 is clamped in place by a headed screw 24 so that one cutting edge extends radially further than the other (FIGURE 1). Screw 24 extends through a central bore (FIGURE 3) in the bar portion 18 and is threaded into an axial bore in the end of the boring bar.

Mounted upon and surrounding the lower end of boring bar 4 is a cylindrical nose cone 30 which is tapered at its lower end to form a frustoconical surface 31 for a support structure 32. Nose cone 30 is formed from a steel cylindrical sleeve 27 which is of uniform radial dimensions, except for the frustoconical lower end and that it is cut away to provide the desired clearance for the boring bits 10 and 11 and for discharging the chips upwardly therefrom. A large number of elongated carbide inserts 29 are snugly received in slots in the nose cone at the frustoconical surface 31 and are cemented in place. Each of the inserts 29 presents a convex surface which is a segment of a cylinder, and these surfaces converge downwardly so as to provide support around a frustrum of a cone having predetermined inner and outer radii. As indicated above, the nose cone is cut away at the boring bits, with there being two diametrically opposite slots 34 and 36 (see FIGURE 3), extending from the bottom of the cone upwardly beyond the respective boring bits 10 and 11. These slots permit free vertical movement of the nose cone with respect to the boring bit, and the slots also guide and discharge the chips upwardly from the workpiece.

Within bore 40 (FIGURE 3) in the boring bar, there is a compression coil spring 42 which rests at its lower end upon a plug or plunger 44 and which is held under compression at its upper end by an adjustable screw plug (not shown) threaded into the top of bore 40. Extending through a transverse hole in plunger 44 is a connector pin 50 which has a head at the right and is threaded at its left-hand end and is screwed into a threaded hole in nose cone 30. The boring bar has slots 54 in which pin 50 is positioned and which permit plug 44, pin 50 and the nose cone to move axially with respect to the boring bar. However, these elements are shown in their rest positions to which they are urged by spring 42.

At the lower end of bore 40 (FIGURE 3) there is a well 39 of smaller diameter than the bore, which has a top edge 41 upon which the tapered lower end of plunger 44 may rest so as to close the top of the well. During operation coolant is received through a fluid-tight coupling (not shown) at the top of the boring bar, and is delivered through bore 40 and well 39 to the workpiece. Hence, plunger 44 acts as a valve to cut off the supply of coolant when the nose cone is in the rest position, but the valve is opened so as to provide coolant when the nose cone is moved upwardly as a result of contact with a workpiece.

Extending radially outwardly from well 39 are two bores 87, each of which connects at its outer end to an arcuate slot 101 in the inner surface of the nose cone. Extending downwardly through the nose cone wall from slots 101 are coolant passageways 103 which are open at their lower ends through surface 31 and are such in number and are so positioned that there is one between each two adjacent carbide inserts 29. Hence, coolant is supplied from well 39 through bores 87, slots 101 and passageways 103 to the zone of the inserts. Extending parallel to the axis of the boring bar downwardly from each of the bores 87 is a bore 105 which is closed at its bottom end, but which connects with a radial bore 107. Bores 107 open respectively to cutting edges of the boring bits 10 and 11 so that coolant is also supplied from well 39 through bores 87, 105 and 107 to each of the cutting edges. The trueing bit 16 receives the coolant indirectly by gravity flow.

As indicated above, the details of construction and operation of the boring tool shown in the drawings is as set forth in my copending applications which are incorporated herein, and access may be had thereto for such details as are desired. This tool is used to enlarge a hole in the workpiece from a size within the range of the trueing bit 16 to the range of the boring bits 10 and 11. As the tool moves toward the workpiece, it is aligned as nearly as possible with the hole. However, the trueing bit permits variations in the size of the original hole and in the trueness of the hole axis to the axis of the boring bar 4. Trueing bit 16 first engages the workpiece and produces a hole having the predetermined true diameter and axis. That hole is of a radius at least as great as the minimum radius of the frustrum of the cone of the outer surfaces of inserts 29. Hence, as the trueing bit produces its hole in the workpiece, the cone moves downwardly and the outer surfaces of the inserts engage the top edge or end of the hole. Each insert makes point contact with the workpiece which is the point where the convex outer surface of the insert engages the top edge of the hole. Hence, the cone rests firmly and is pressed against the workpiece by spring 42.

As the operation continues, the cone remains nested against the end of the hole and the boring bar continues to move into the hole. However, at the time that the boring bits 10 and 11 reach the workpiece, they start to cut the workpiece around the hole upon which the cone rests. Thereafter, as the boring bits cut away the workpiece around the hole, the cone rests upon the hole produced by the trueing bit and is firmly held in place by the rigidity of the boring bar and by the tension of spring 42. The cutting edges of the boring bits 10 and 11 are spaced in diametric alignment symmetrically with respect to the boring axis, and they produce substantially equal and opposite reaction forces. That is, as one boring bit engages and cuts the workpiece, it produces reaction forces tending to deflect the end of the boring tool away from the true boring axis. The construction of the boring tool is such that those reaction forces are restrained and resisted. However, the equal and opposite effects of the two boring bits produce a balanced tool, so that the boring bar and the nose cone are subjected to minimum deflection forces. That is, the utilization of more than one boring bit permits the setting up of a symmetrically balanced reaction force system which transmits minimum forces outside of the system. The nose cone provides firm support by its engagement with the workpiece, and the support is in radial alignment with the cutting zones of the boring bits. Hence, the invention permits the maintenance of extremely close tolerances in the holes bored. At the same time the boring bits may produce very substantial cuts to materially increase the size of the hole.

It has been pointed out above that trueing bit 16 is so positioned that only one of its cutting edges engages the workpiece. It is contemplated that it may be adjusted when desirable so that either of its cutting edges is used, and that they may have cutting edges of different characteristics. In reviewing the operation, when plunger 44 and nose cone 30 are in rest position, the supply of coolant is cut off by plunger 44; and when the nose cone engages the workpiece, it is held from moving downwardly, and the downward movement of the boring bar carries edge 41 downwardly away from plunger 44. That, in effect, moves plunger 44 upwardly away from edge 41, and opens the valve so that coolant then flows through the respective bores and passageways to the zone of the inserts 29 and also to the cutting edges of the boring bits 10 and trueing bit 16.

It has been found that this is a very satisfactory arrangement for supplying coolant to the entire cutting operation and for supporting the nose cone. Operations may be carried on at a relatively high speed without galling. The terms "up" and "down" and related terms are used with reference to the drawings and with reference to the use of the tool when the boring bar is in the vertical position. However, it is understood that the boring bar may be used in other positions and the operation will be as described.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

What is claimed is:

1. A boring tool which is adapted to cut away the side wall of an original hole in a workpiece and which comprises, the combination of, a boring bar having a tool end which is adapted to project into an original hole in a workpiece while it is supported at its other end, a pair of boring bits rigidly mounted upon said tool end of said boring bar and presenting cutting edges each of which extends generally radially through a boring zone from a minimum radius which is less than the minimum radius of said original hole to a maximum radius which is the radius of the final hole which is being bored, said boring bits having mounting portions positioned side by side in a substantially diammetric opening through said boring bar and having cutting portions which project radially outwardly from the opposite sides of said boring bar whereby their cutting edges engage the workpiece substantially symmetrically upon the opposite sides of the axis of said boring bar, said boring bits having coextensive side faces which are positioned within a plane at the axis of said boring bar, clamping screw means engaging one of said boring bits and exerting a clamping force through it to the other of said boring bits and thereby clamping the boring bits together against radial movement, a nose cone slidably mounted to move axially upon said boring bar, said nose cone including a plurality of contact elements each of which presents a bearing surface which is along a cone frustrum which has a minimum radius which is less than the minimum radius of said original hole and a maximum radius which is greater than the maximum radius of said original hole whereby said bearing surfaces are adapted to be projected against and rest upon the end of said original hole, and positioning means to position said nose cone longitudinally of said boring bar in a position wherein a portion of said bearing surfaces is in leading relationship with respect to said cutting edges of said boring bits, said positioning means permitting said boring bars to be projected longitudinally to a cutting position relative to the workpiece wherein said cutting edges of said boring bits intersect the cone fustrum of said bearing surfaces and wherein said bearing surfaces are nested in said original hole.

References Cited

UNITED STATES PATENTS

| | | | |
|---|---|---|---|
| 496,253 | 4/1893 | Federschmidt | 77—58 |
| 1,387,652 | 8/1921 | Lipe | 77—58.1 |
| 1,769,230 | 7/1930 | Manning | 77—58.37 |
| 1,939,490 | 12/1933 | Dixon | 77—58.1 |
| 2,846,904 | 8/1958 | Dow | 77—58.37 |
| 3,065,655 | 11/1962 | Elias | 77—58.1 |
| 3,309,945 | 3/1967 | Halpern | 77—58.1 |
| 3,314,314 | 4/1967 | Halpern | 77—58.1 |
| 876,999 | 1/1908 | Reiss | 77—58 |
| 1,487,533 | 3/1924 | Bryan | 77—58 |

FOREIGN PATENTS 76,294   5/1931   Sweden.

GERALD A. DOST, Primary Examiner